(12) United States Patent
Saga et al.

(10) Patent No.: US 6,714,148 B1
(45) Date of Patent: Mar. 30, 2004

(54) DIGITAL PROTECTIVE RELAY

(75) Inventors: Masamichi Saga, Fuchu (JP); Itsuo Shuto, Hachioji (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 648 days.

(21) Appl. No.: 09/628,305

(22) Filed: Jul. 28, 2000

(30) Foreign Application Priority Data

Jul. 28, 1999 (JP) .......................................... 11-213194

(51) Int. Cl.$^7$ ................................................. H03M 1/00
(52) U.S. Cl. ........................................ 341/126; 341/155
(58) Field of Search ................................ 341/155, 126, 341/139, 132

(56) References Cited

U.S. PATENT DOCUMENTS 4,464,698 A * 8/1984 Yoshizaki ..................... 361/79
5,255,202 A * 10/1993 Kido et al. .................. 702/190
6,370,483 B1 * 4/2002 Beckwith ..................... 702/65

* cited by examiner

Primary Examiner—Jean Jeanglaude
(74) Attorney, Agent, or Firm—Finnegan, Henderson, Farabow, Garrett & Dunner, L.L.P.

(57) ABSTRACT

A digital protective relay comprises a protective relay arithmetic processing unit for judging, based on a relay judgement quantity obtained by converting a system electric quantity into a digital value, whether in an operating state or in a non-operating state, and a time synchronizing unit for inputting a time reference signal from outside and synchronizing an internal timer of the digital protective relay with an external reference time. The time synchronizing unit includes an A/D converting unit for A/D converting the time reference signal inputted from outside with a resolution of at least 2 bits, and a decoding unit for decoding a time code signal by making a judgement as to a magnitude of the time reference signal with respect to a digital value obtained by the A/D converting unit.

4 Claims, 8 Drawing Sheets

US 6,714,148 B1

DIGITAL PROTECTIVE RELAY

BACKGROUND OF THE INVENTION

1. Field of the Invention

The present invention relates to a digital protective relay, and more particularly to a decoding unit for decoding a time reference signal in the digital protective relay.

2. Related Background Art

In the digital protective relay, for the purpose of judging whether a breaker in an electric power system is tripped by detecting a change in state of the power system and adding an exact time of occurrence to data about the change in state and thus recording the data, a time reference signal is inputted from outside of the digital protective relay, and a time of an internal timer is synchronized with this time reference signal. An IRIG signal may be given for use by way of one example of the time reference signal. The IRIG signal serves to transmit time data in serial codes and also a precise timing of updating the time at a timing of a head of frame as well as a rise of a carrier the IRIG signal is defined as an amplitude modulation signal, wherein a level ratio when an amplitude is large and small is specified such as 3.3:1 (=10:3), however, there is no definition in terms of a specific voltage level and waveform as well.

Herein, let VH be a level when the amplitude is large, and VL be a level when small. Based on when changed from the level VL to the level VH, a code is [1] when a continuous time ratio of the level VH to the level VL is 5:5, and the code is [0] when at a ratio of 2:8. When the continuous time ratio is 8:2, that is represented by a marker code [P] as a reference of a time frame, and there becomes a head of the time frame when the code [P] continues twice.

There are some categories of the IRIG signal according to a time scale, however, a carrier signal with a frequency of 1 kHz and an IRIG-B signal with a time frame being 1 sec are comparatively widely used. FIG. 6 shows a waveform image of the code [0] of the IRIG-B signal. FIG. 7 shows a waveform image of the code [1]. FIG. 8 shows a waveform of the code [P].

From what has been described above, there must be a necessity for judging the levels VH and VL and discriminating and extracting binary data of code[0]/[1] on the basis of a continuous time of the level VH or VL in order to decode the time data from the IRIG signal.

FIG. 9 is a block diagram showing processes starting from taking in the IRIG signal to decoding in the conventional digital protective relay. FIG. 10 is a graph showing relations among signals T1~T6 in the respective portions in FIG. 9. An IRIG signal T1 is received by an insulating device 1 and transmitted through a full-wave rectifier 2, thereby obtaining a signal T2.

A smoothing circuit 3 smoothes the signal T2, thereby obtaining a signal T3. The signal T3 is inputted to a comparison input terminal of a comparator 91 and compared with a voltage threshold value $V_{TH}$ inputted to a reference input terminal. The voltage threshold value $V_{TH}$ inputted to the reference input terminal is obtained by dividing a voltage of, e.g., 5V with a voltage divider constructed of a resistor R7 and a variable resistance VR. The comparator 91 binarizes the signal T3 inputted to the comparison input terminal depending on a magnitude of the compared result, thereby obtaining a signal T4. A timer 93 is reset and started at a rise of the signal T4 and stopped at a fall of the signal T4, whereby a continuous time when the signal T4 is at the H-level can be measured. A code discriminator 94 discriminates the measured continuous time. Based on two threshold values preset therein, if existing in a short/small region, the code [0] is outputted. If existing in an intermediate region, the code [1] is outputted, and, if existing in a long/large region, the code [P] is outputted.

An output of the code discriminator 94 is stored in a memory 5 and converted into a time signal by software on a CPU 6. A head of the time frame comes with a trigger being a timing when the code [P] continues twice, and a weight of each code with respect to the time is predetermined. Then, a series of time signals can be univocally converted time values.

A problem inherent in the conventional digital protective relay described is that a larger number of processes are needed because of the voltage threshold value $V_{TH}$ in the comparator 91 having to be adjusted with the variable resistance when in the manufacturing process of the digital protective relay, and that a great number of electronic parts are required for decoding, resulting in an increase in cost.

SUMMARY OF THE INVENTION

It is a primary object of the present invention to provide a digital protective relay capable of eliminating a necessity for adjusting an input circuit of a time reference signal and reducing costs by decreasing the number of electronic parts.

To accomplish the above object, the digital protective relay according to the present invention is constructed so that a value, into which the time reference signal is A/D converted, is compared with a fixed threshold value by software on a CPU in order to discriminate H- and L-levels from each other, and a time code is obtained by distinguishing between codes [0]. [1] and [P] in accordance with an H-level continuous time on the basis of a timing when changed from the L-level to the H-level. This contrivance eliminates necessities for a comparator, a timer and a timer value judging circuit and for adjusting a voltage of the comparator.

It is possible to A/D convert the time reference signal and execute decoding into a time code by use of a CPU and an A/D converting unit used for a protective relay calculation. With this contrivance, new pieces of hardware required can be omitted, and the costs for the hardware can be reduced.

A peak value is calculated by the software on the CPU from the data into which the time reference signal is A/D converted, and a threshold value for VH and VL is determined based on this peak value. The H- and L-levels are judged based on this threshold value, and the time code can be obtained by distinguishing between the codes [0], [1] and [P] in accordance with the H-level continuous time on the basis of the timing when changed from the L-level to the H-level. An input circuit of the time reference signal shown in FIG. 1, when a voltage level of the time reference signal rises, an output voltage of a smoothing unit 3 when at VL also rises. Hence, if the threshold value for distinguishing between the H- and L-levels is fixed, a voltage of the time reference signal that can be inputted is restricted. According to this contrivance, the threshold value may be taken large when the voltage of the time reference signal is high and taken small when low, whereby a voltage range of the time reference signal can be expanded.

In the digital protective relay constructed such that a peak value is calculated by the software on the CPU from the data into which the time reference signal is A/D converted, the threshold value for VH and VL is determined based on this peak value, the H- and L-levels are judged based on this threshold value, and the time code can be obtained by distinguishing between the codes [0], [1] and [P] in accordance with the H-level continuous time on the basis of the timing when changed from the L-level to the H-level, the peak value can be calculated by A/D converting the time reference signal at a sampling frequency asynchronous to a carrier frequency of the time reference signal. If a greatest common divisor of the sampling frequency and the carrier frequency of the time reference signal is large, it follows that a sampling angle becomes large, and there might be a case where the peak value of the time reference signal can not be detected at a high accuracy. According to the contrivance described above, however, even in such a case, a sampling phase shifts so as to be capable of sampling in the vicinity of the peak value, and it is therefore feasible to properly set the threshold value and enhance a degree of allowance for decoding the time code.

DESCRIPTION OF THE PREFERRED EMBODIMENTS

Figure 1:
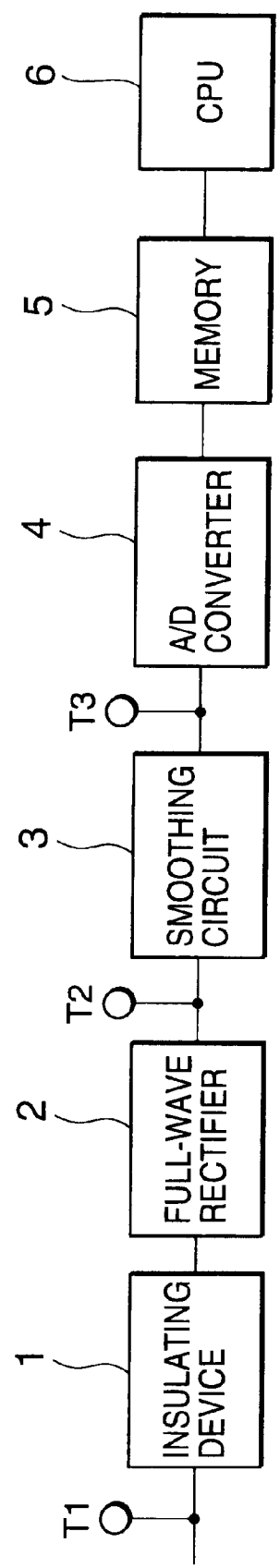
FIG. 1 is a block diagram showing a time reference signal decoding unit of a digital protective relay in a first embodiment of the present invention.
Figure 2:
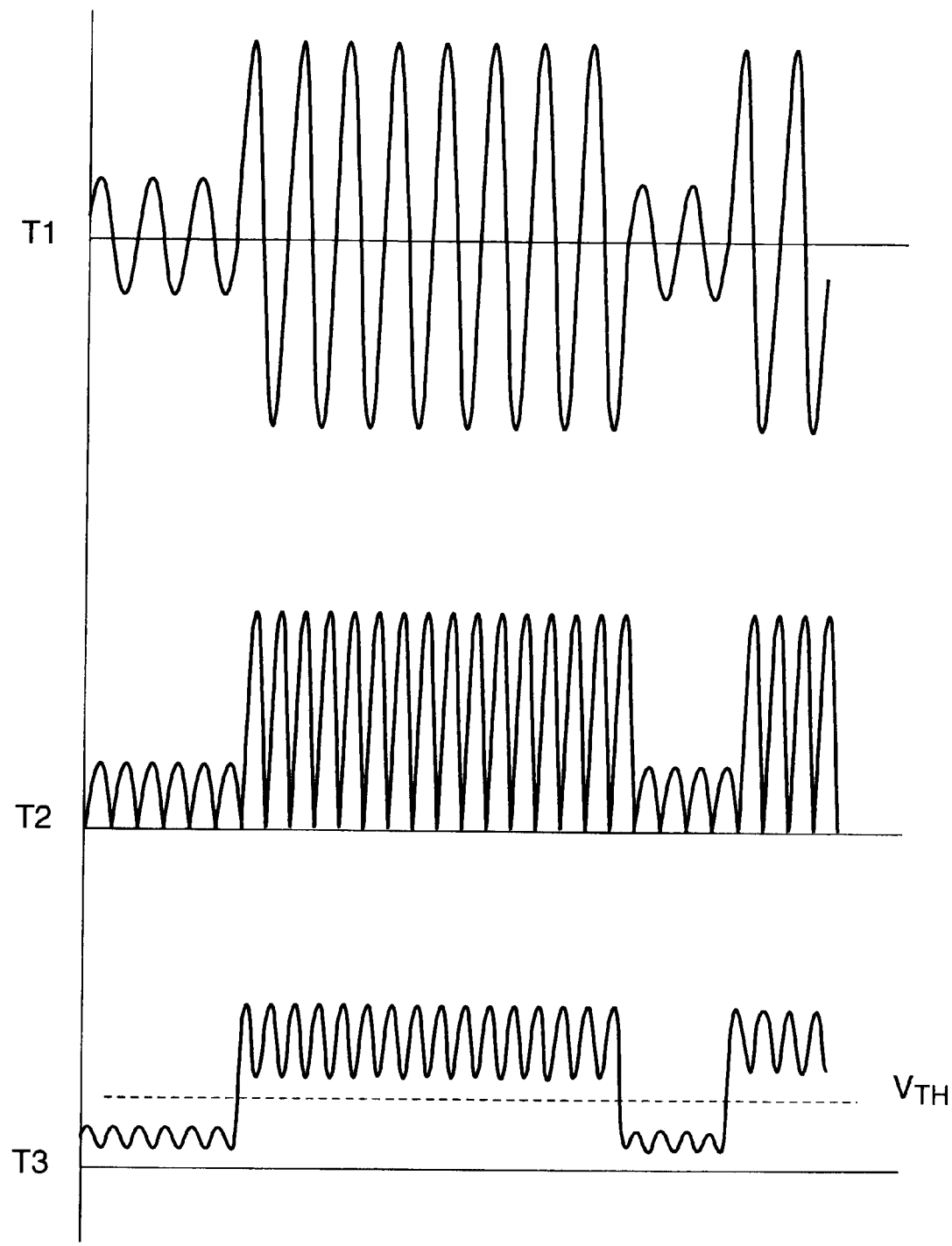
FIG. 2 is a graph showing mutual relations between signals from a process of taking in a time reference signal to a process of an A/D conversion in the digital protective relay shown in FIG. 1.
Figure 9:
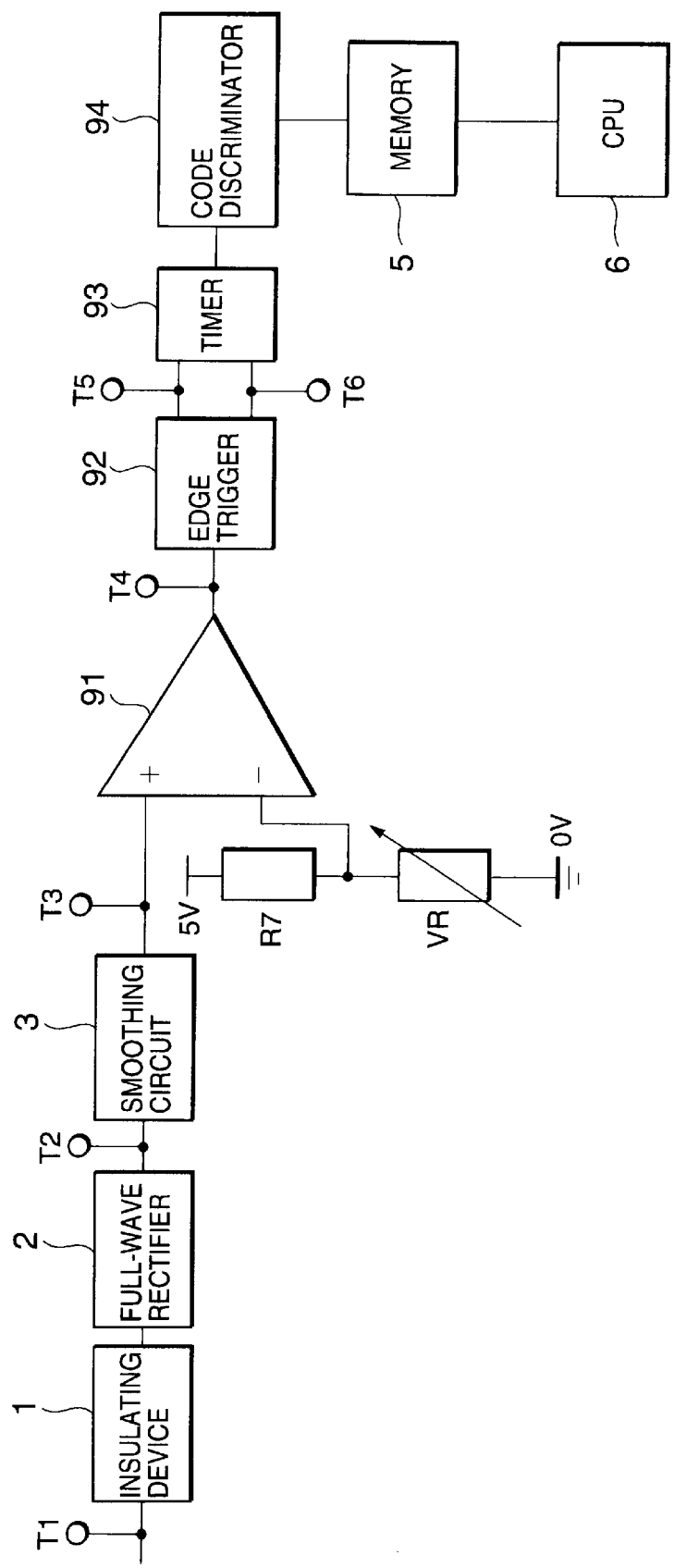
FIG. 9 is a block diagram showing functions starting from taking in the time reference signal to decoding in a conventional digital protective relay.
Figure 10:
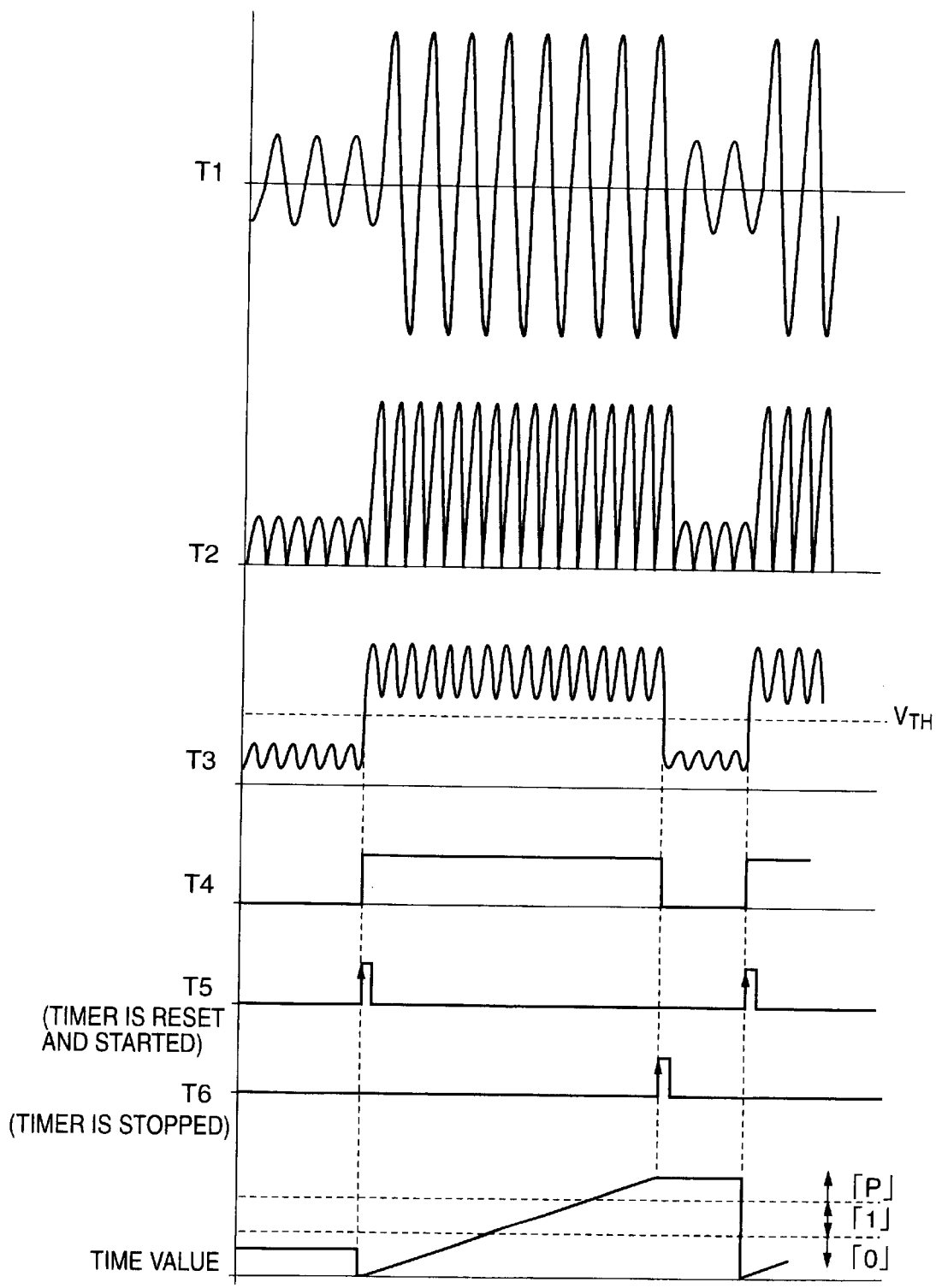
FIG. 10 is a graph showing mutual relations between signals from the process of taking in the time reference signal to the process of decoding in the conventional digital protective relay.

Embodiment 1:

FIG. 1 shows a time reference signal decoding unit of a digital protective relay in a first embodiment of the present invention. FIG. 2 is a graph showing a relation among signals T1 through T3 in FIG. 1. Note that the same functional components as those in FIG. 9 are marked with the like numerals, of which repetitive individual explanations are herein omitted. A difference between the digital protective relay in the first embodiment and the conventional protective relay shown in FIG. 9, is that the comparator 91, the edge trigger 92, the timer 93 and the code discriminator 94 are omitted, and an A/D converter 4 is provided between a smoothing circuit 3 and a memory 5 in the present invention.

It is herein assumed that a time reference IRIG signal-B is given. The signal T1, i.e., the IRIG signal-B is received by an insulating device 1, e.g., a photo coupler and is full-wave-rectified by a full-wave rectifier 2, thereby obtaining a signal T2. An output of the IRIG signal-B when an amplitude is large can be, as shown in the form of the signal T3, kept with a predetermined level value or larger by letting this signal T2 through the smoothing circuit 3. An output of the smoothing circuit 3 is subjected to sampling at a frequency of 2880 Hz and to an A/D conversion in an A/D converter 4. A digital output value is transferred to a CPU 6 via a memory 5 and processed by software on the CPU 6.

Figure 3:
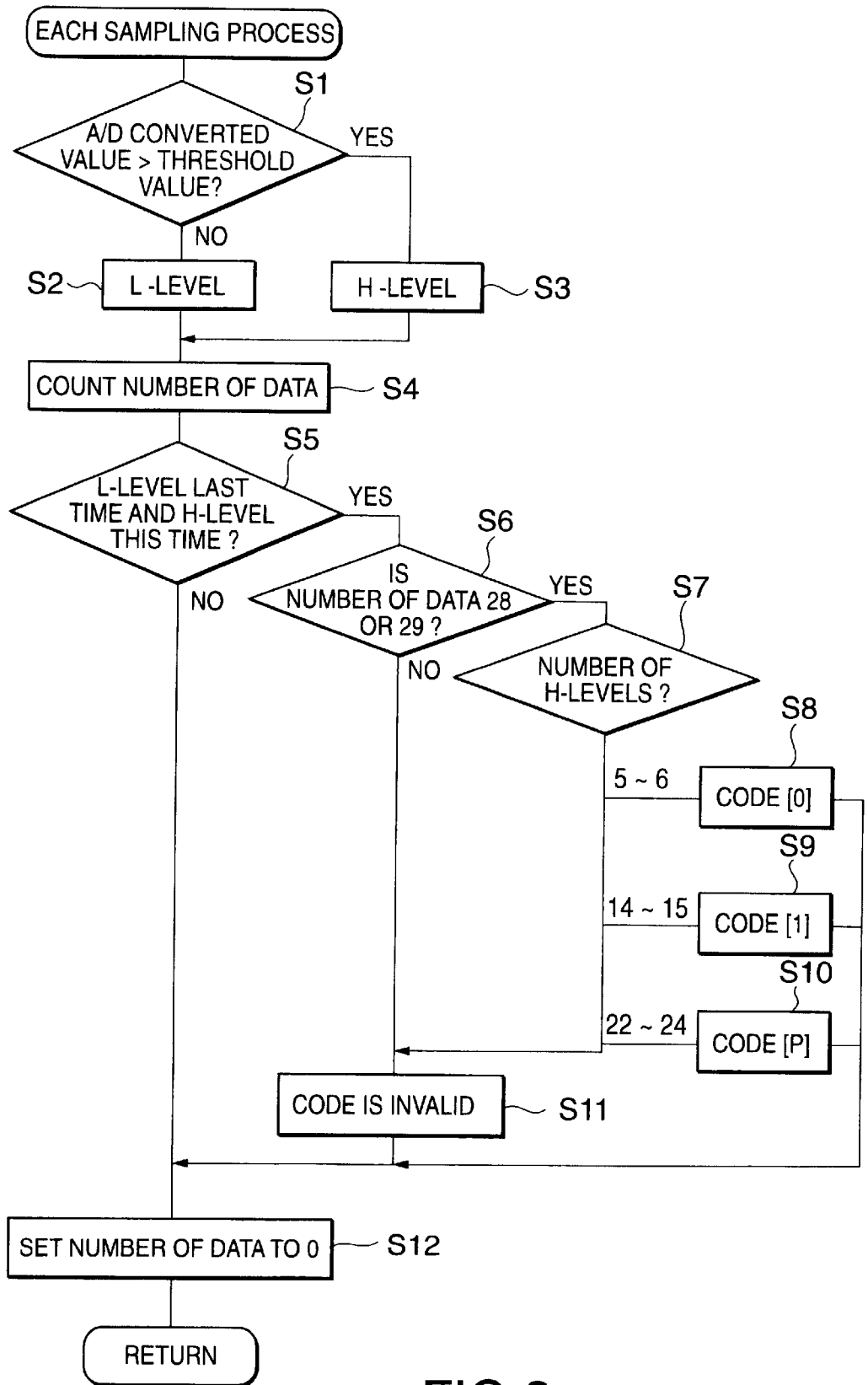
FIG. 3 is a flowchart showing steps of a software processing of the digital protective relay shown in FIG. 1.

FIG. 3 is a flowchart showing a software process by the CPU 6. The digital value obtained by the A/D converter 4 is compared with a fixed voltage threshold value $V_{TH}$ (step S1). If the digital value is smaller than the voltage threshold value $V_{Th}$, it is judged to be a Low level (L-level) (step S2). Whereas if larger than $V_{TH}$, it is judged to be a High level (H-level) (step S3), and a binary conversion is executed. The voltage threshold value $V_{TH}$ is selected so that the digital output value at a level VH is judged to be at the H-level and the digital output value at a level VL is judged to be at the L-level. Herein, the number of pieces of data (the number of pulses) within one sampling cycle is counted (step S4).

A sampling frequency is set to, e.g., 2880 Hz that is 48 times as high as a system frequency, and is subjected to the sampling and the A/D conversion, whereby the number of pieces of sample data in one code frame time 10 ms becomes 28.8 samples. Accordingly, if the data are segmented with a trigger being a timing when the signal changes from the L-level to the H-level (step S5), an estimation is that 28 or 29 pieces of sample data must be obtained in one code frame time.

Herein, among the 28.8 samplings in respective codes [0], [1] and [P], the number of data assuming the H-level larger than the threshold value $V_{TH}$ is as follows:

Code [0]: 28.8×2 ms/10 ms=5.76 [samples]
Code [1]: 28.8×5 ms/10 ms=14.4 [samples]
Code [P]: 28.8×8 ms/10 ms=23.04 [samples]

It is therefore confirmed that the number of data is 28 or 29 (step S6). Then, corresponding to the number of data taking the H-level within one code frame time, decoding can be executed in such a way that when the number of data is 5~6, the code is [o], when being 14 or 15, the code is [1], and when being 22 through 24, the code is [P] (steps S7~S10). If the number of data is neither 28 nor 29, and if the number of data at the H-level is a numerical value that does not correspond to any codes, an invalid process is executed (step S11). With the operations performed so far, the decoding process within one sampling cycle comes to an end, and the number of data is reset to 0 (zero) (step S12), thus finishing it. If the signal does not change from the L-level to the H-level in step S5, without executing the decoding process this time, the number-of-data reset process in step S12 is implemented, thus coming to an end.

After obtaining the codes [0], [1] and [P] in steps S8 through S1, these codes may be converted into time code according to the prior art.

The first embodiment does not require any adjustment of the hardware when manufactured and is, in addition, capable of reducing the costs by decreasing the number of parts.

Figure 4:
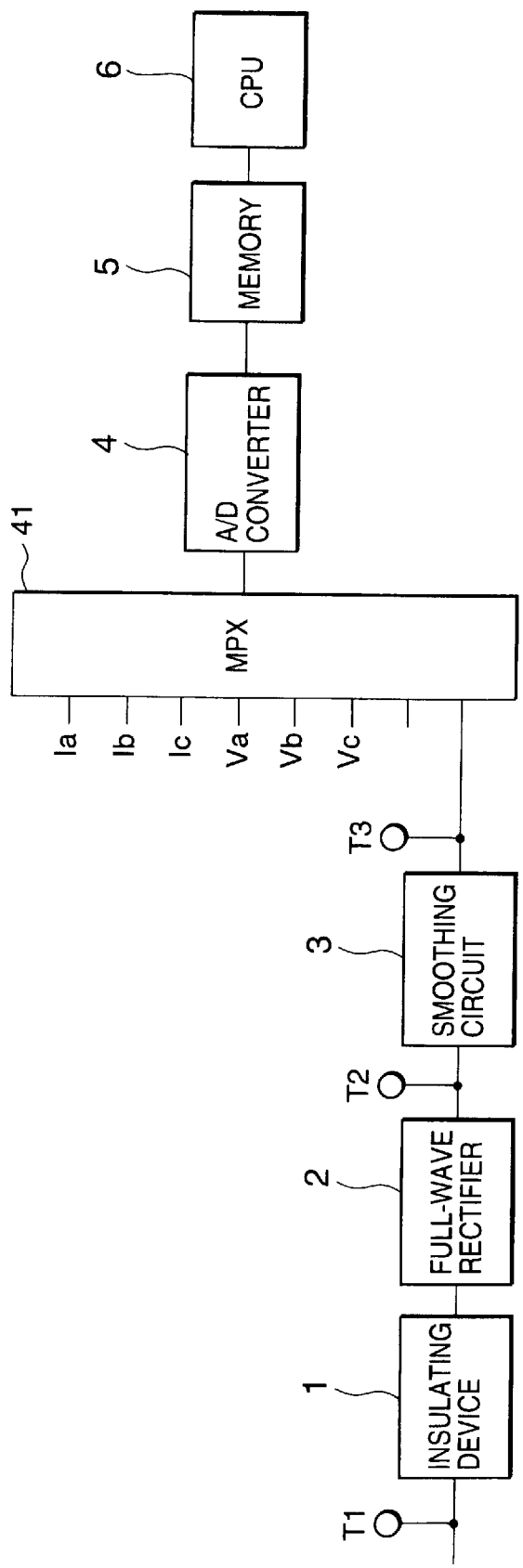
FIG. 4 is a block diagram showing the time reference signal decoding unit of the digital protective relay in a second embodiment of the present invention.

Embodiment 2:

FIG. 4 illustrates a second embodiment of the present invention. What is characteristic of the second embodiment is that a multiplexer (MPX) 41 is provided between the smoothing circuit 3 and the A/D converter 4.

An output signal T3 of the smoothing circuit 3 is inputted to the multiplexer (MPX) 41 together with an electric quantity of a power system used for a protective relay calculation, which may be, e.g., 3-phase currents Ia, Ib, Ic and 3-phase voltages Va, Vb, Vc, and these input signals are further inputted to the A/D converter 4 in a way of being sequentially switched by the multiplexer 41. As the sampling frequency in the A/D converter 4 becomes higher, a timing for updating the time, i.e., a change from the level VL to the level VH can be detected with a higher accuracy. In the case of sampling being effected at a sampling frequency of, e.g., 1 kHz, the sampling cycle is 1 ms, and a delay of detection of the timing for updating the time can be restrained down to 1 ms or smaller.

According to the digital protective relay, the system electric quantity is A/D converted at the sampling frequency of 600 Hz or 720 Hz at the minimum that is 12 times the system frequency (50 Hz or 60 Hz). The digital protective relay has the sampling frequency that is sufficiently utilized in terms of a precision of synchronizing the timing.

In accordance with the second embodiment, the time reference signal is inputted to a free channel of the multiplexer 41 inevitably used for switching the voltage and the current, thereby making it feasible to eliminate the necessity for new pieces of hardware required for decoding the time reference signal.

Figure 5:
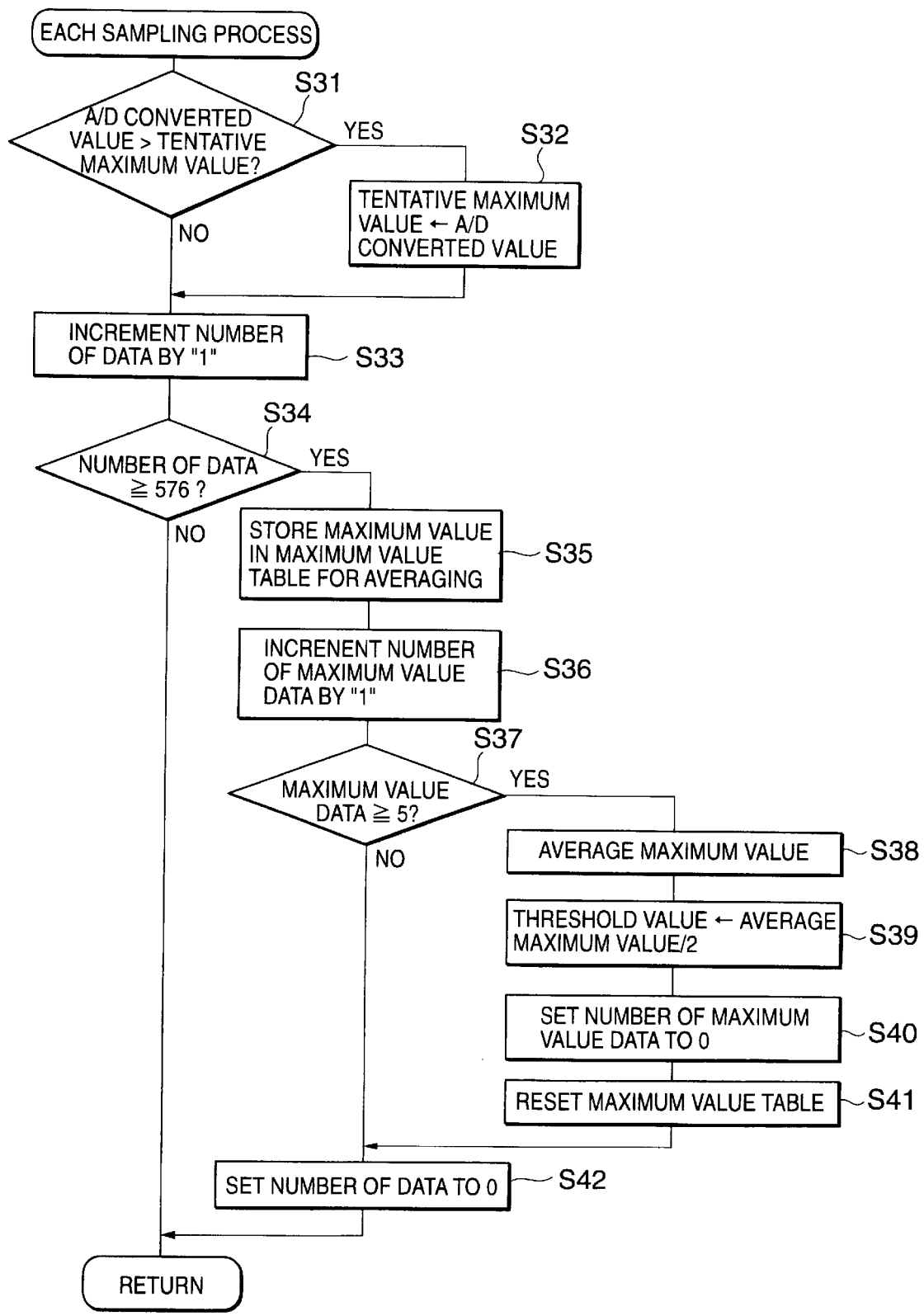
FIG. 5 is a flowchart showing steps of the software processing of the digital protective relay in a third embodiment of the present invention.
Figure 6:
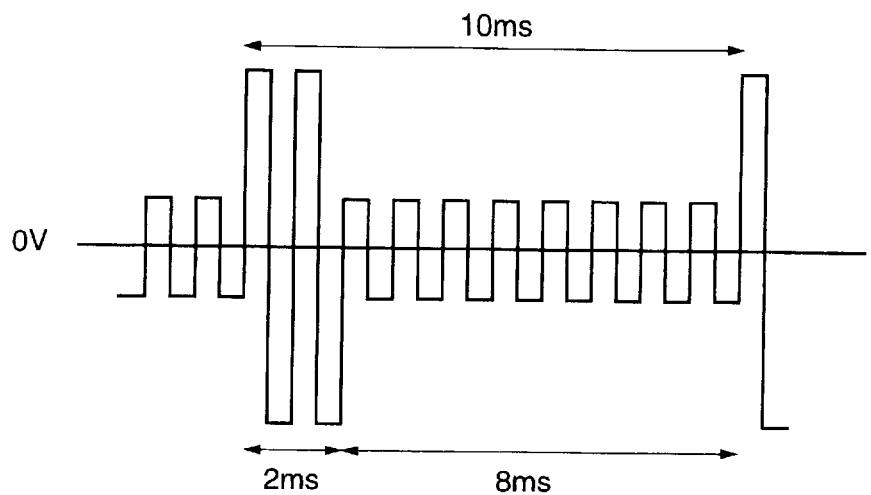
FIG. 6 is a diagram illustrating a waveform image of a code [0] of an IRIG-B signal.
Figure 7:
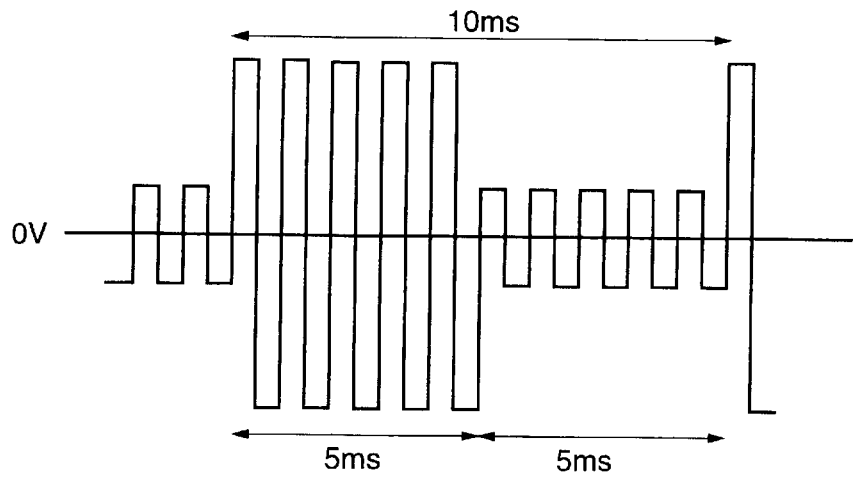
FIG. 7 is a diagram illustrating a waveform image of a code [1] of the IRIG-B signal.
Figure 8:
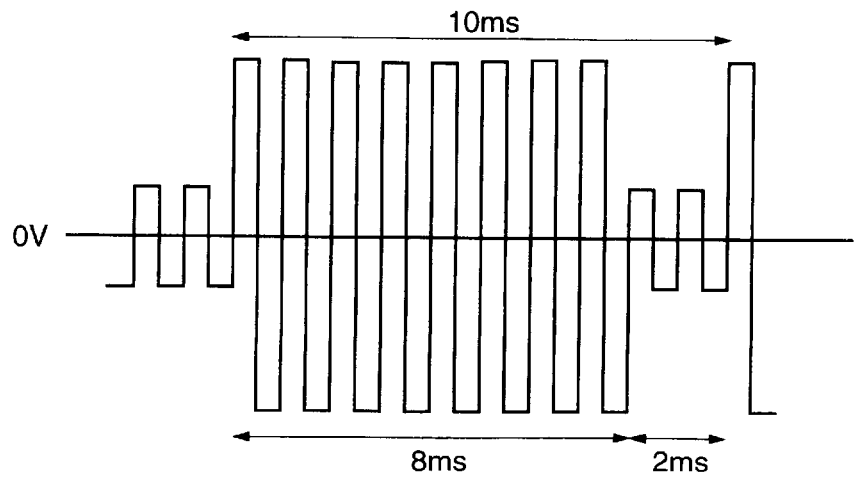
FIG. 8 is a diagram illustrating a waveform image of a code [P] of the IRIG-B signal.

Embodiment 3:

In a third embodiment, a maximum value of the time reference signal, which has been A/D converted, is calculated for obtaining a threshold value for discriminating whether the input signal is at the H- or L-level in the first or second embodiment. FIG. 5 is a flowchart showing a threshold value calculation process.

The signal T2 obtained by full-wave-rectifying the IRIG signal-B is a signal of which a frequency is on the order of 1 kHz×2=2 kHz. When sampling this at a sampling frequency of 2880 Hz, an electric angle corresponding to a sampling cycle is 250° (360°×2000/2880 ). A greatest common divisor of 250° and 360° is 10°, and, if ensuring 36 [samples] given by 9000/250=36 where 9000° is a least common denominator of 250° and 360°, the data corresponding to the sampling angle of 10° is obtained. A unit number of samplings with which a maximum value is detected, is set to 36 samples.

Further, the bit value is [0] in a large proportion of a second half of the timing code format of IRIG-B, and the H-level signals in the vicinity of this bit frame (10 ms) exist by only 20%. Accordingly, when aiming at sampling on the order of 10°, at least 5-fold (180) samples of 36 samples are needed. A least common denominator of the 10 ms bit frame and the 36 samples (12.5 ms) is 50 ms, which is estimated at 144 in the number of samples. Hence, even when taking 180 samples, the H-level signals can not be taken out of 20% of 180 samples. This might lead to a possibility of causing a phase difference of ±15° between the maximum value obtained by sampling and an actual peak value.

An influence by the sampling phase difference from a position of the maximum value may be a degree such as cos(15°) −1=−0.034 (=−3.4%), based on even such an assumption that an original waveform of sampling be a sine wave of 2 KHz with a peak value as an amplitude. The number of samplings with which the maximum value is detected is given by 36 samples×16=576 samples (200 ms), and an average of five sets (1 sec) of 576 samples is obtained (step S38). This average is set as a maximum value, in which case a fluctuation in the maximum value can be restrained to ±1.7%.

Then, an A/D converted value is compared with a tentative maximum value (step S31). If the A/D converted value exceeds the tentative maximum value, this A/D converted value is set as a new tentative maximum value (Step S32). Whereas if the A/D converted value does not exceed the tentative maximum value, an increment of "1" is given for counting the number of pieces of data (step S33). It is judged whether or not the number of data is equal to or larger than 576 (=36×16) (step S34). If under 576, "Return" is executed to terminate the IRIG signal process in the present sampling process. If the number of data is over 576, the tentative maximum value obtained in step S32 is stored in a maximum value table for averaging (step S35), and an initial number of maximum value data is incremented by "1" (step S36), thereby setting the number of maximum value data to "1". The number of maximum value data is checked (step S37). Herein, an average value is calculated by use of the maximum values for five sets, and it is therefore judged whether or not the number of maximum value data comes to "5". If the number of maximum value data does not reach "5", the number of data is temporarily reset to "0" (step S35), and the operation enters a new sampling process. If it is judged in S37 that the number of maximum value data reaches "5", the maximum values stored in the maximum value table for averaging is averaged in step S35 (step S38). The average value is halved, and this ½ value is set as a threshold value (step S39). Thereafter, for determining the threshold value next time, the number of maximum value data is reset to zero (step S40), and the maximum value table is also reset (step S41). Then, the number of data which has been obtained in step S33 is reset (step S42), and this IRIG process in sampling comes to an end.

In step S39, ½ of the calculated average maximum value is determined as the threshold value, and a ratio of this threshold value to the maximum value may be determined so as to take a sufficient level margin both on the H-level side and on the L-level side in consideration of characteristics of the full-wave rectifier circuit 2 and of the smoothing circuit 3.

In sampling at 2880 Hz, the number of sample data in one code frame time 10 ms becomes 28.8 samples, and 28 or 29 samples are obtained if the data are segmented with the trigger being a timing when the signal changes from the L-level to the H-level. As in the first embodiment, the code is judged based on the number of the H-level samples, and the conversion into the time code may be done by a known method.

In accordance with the third embodiment, the level judgement can be made corresponding to the voltage level of the time reference signal, whereby a range of the input voltage of the time reference signal can be expanded.

Embodiment 4:

A contrivance of a fourth embodiment is that the time reference signal is A/D converted at a sampling frequency asynchronous with a carrier frequency of the time reference signal, and a maximum value of the voltage of the time reference signal can be calculated more precisely.

When the sampling frequency is 2400 Hz, a signal having a frequency on the order of 2 kHz is subjected to sampling, and a sampling angle thereof is 300° (=360°×2000/2400). No matter how much sampling is executed over six samples, there are obtained merely sampling data corresponding to 60°. An influence the sampling phase difference from a position of the maximum value may be a degree such as cos(30°)−1=−13.4%, based on the assumption that the sampling waveform be a sine wave of 2 KHz with a peak value as an amplitude.

Herein, if the sampling frequency deviates from 2400 Hz, it follows that the maximum value can be detected more accurately. For example, if set to 2400.192 Hz with a deviation of 80 ppm, there is a deviation on the order of 40 μs for 0.5 second, a slip of approximately 29 degrees can be made at an electric angle of 2 KHz. Accordingly, even if incapable of obtaining the A/D converted value in the vicinity of the maximum value of the voltage at the sampling timing, a value as close as the maximum value can be obtained by searching with respect to the 0.5 sec samples.

Further, as in the case of the sampling frequency of 2880 Hz given in the first embodiment, there may be selected a sampling frequency at which a sampling phase of the time synchronous signal is taken at an interval as small as 10 degrees. If given a sufficiently small greatest common divisor with respect to the sampling angle of 360° for a double of the carrier frequency of the time synchronous signal, an error between the maximum value of the A/D converted value and the actual maximum value of the time synchronous signal, decreases.

In accordance with the fourth embodiment, the detection error of the input level of the time reference signal becomes small, and hence the amplitude level judgement processing unit for judging the amplitude level of the time reference signal is capable of setting a proper threshold value, thereby enhancing a degree of allowance for decoding the time reference signal.

What is claimed is:

1. A digital protective relay comprising:

protective relay arithmetic processing means for judging, based on a relay judgment quantity obtained by converting a system electric quantity into a digital value, whether in an operating state or in a non-operating state; and time synchronizing means for inputting a time reference signal, including a time code containing time information, from outside and synchronizing an internal timer of said digital protective relay with an external reference time, said time synchronizing means including:

A/D converting means for A/D converting the time reference signal inputted from outside with a resolution of at least 2 bits and decoding means for decoding a time code signal by making a judgment as to a magnitude of the time reference signal with respect to a digital value obtained by said A/D converting means.

2. A digital protective relay according to claim 1, wherein A/D converting means for A/D converting a system electric quantity used for a protective relay calculation is shared as said A/D converting means for A/D converting the time reference signal.

3. A digital protective relay according to claim 1 or 2, further comprising:

amplitude level judgment processing means for judging whether or not an input voltage amplitude level of the time reference signal exceeds a level threshold value; and means for adjusting the level threshold value of said amplitude level judgment processing means in accordance with the input voltage amplitude level.

4. A digital protective relay according to any one of claims 1 or 2, wherein said A/D converting means selects, as a frequency for sampling the time reference signal, a sampling frequency asynchronous to a carrier frequency of the time reference signal.

* * * * *